(12) United States Patent
Nakayama

(10) Patent No.: US 10,151,659 B2
(45) Date of Patent: Dec. 11, 2018

(54) CYLINDER INTERNAL PRESSURE SENSOR

(71) Applicant: TOYOTA JIDOSHA KABUSHIKI KAISHA, Toyota-shi, Aichi-ken (JP)

(72) Inventor: Masao Nakayama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 15/297,469

(22) Filed: Oct. 19, 2016

(65) Prior Publication Data

US 2017/0122830 A1 May 4, 2017

(30) Foreign Application Priority Data

Nov. 4, 2015 (JP) ................................. 2015-216955

(51) Int. Cl.
*G01L 23/22* (2006.01)
*G01L 23/02* (2006.01)
*F02D 35/02* (2006.01)
*F02D 37/02* (2006.01)

(52) U.S. Cl.
CPC ............ *G01L 23/225* (2013.01); *G01L 23/02* (2013.01); *F02D 35/023* (2013.01); *F02D 37/02* (2013.01)

(58) Field of Classification Search
CPC .................................................... G01L 23/225
USPC ........................................................ 73/35.12
See application file for complete search history.

(56) References Cited

U.S. PATENT DOCUMENTS

| | | | | |
|---|---|---|---|---|
| 2004/0231425 | A1* | 11/2004 | Mizuno | ................... G01L 23/10 73/715 |
| 2010/0024639 | A1* | 2/2010 | Taylor | ................ B01D 46/0032 95/2 |
| 2010/0274741 | A1* | 10/2010 | Thomas | ............... B21D 28/243 705/500 |
| 2013/0298865 | A1 | 11/2013 | Ratosa et al. | |

FOREIGN PATENT DOCUMENTS

| | | |
|---|---|---|
| JP | H02-081440 U | 6/1990 |
| JP | 2004-349133 A | 12/2004 |
| JP | 2005-249721 A | 9/2005 |
| JP | 2009-008694 A | 1/2009 |
| JP | 4638934 B2 | 2/2011 |
| JP | 2014-048181 A | 3/2014 |

OTHER PUBLICATIONS

Aug. 1, 2017 Decision to Grant a Patent issued in Japanese Patent Application No. 2015-216955.

* cited by examiner

*Primary Examiner* — Walter L Lindsay, Jr.
*Assistant Examiner* — Philip Marcus T Fadul
(74) *Attorney, Agent, or Firm* — Oliff PLC

(57) ABSTRACT

A cylinder internal pressure sensor includes: a housing; a diaphragm having flexibility and being joined to one end of the housing; a sensor element configured to change an output signal according to deformation of the diaphragm; and an opposed member housed inside the housing so as to face the diaphragm. The opposed member defines a housing room between the diaphragm and the opposed member, and includes: a cylindrical tube part being a layered structure with an inner tube and an outer tube; and a seal part provided inside the tube part. The sensor element is fixed to the seal part. The tube part is provided with a spring rate reducing portion that is provided between the diaphragm and a (Continued)

position where the inner tube and the outer tube are joined together.

2 Claims, 6 Drawing Sheets

CYLINDER INTERNAL PRESSURE SENSOR

INCORPORATION BY REFERENCE

The disclosure of Japanese Patent Application No. 2015-216955 filed on Nov. 4, 2015 including the specification, drawings and abstract is incorporated herein by reference in its entirety.

BACKGROUND

1. Technical Field

The present disclosure relates to a cylinder internal pressure sensor for detecting a cylinder internal pressure that is the pressure inside the combustion chamber of an internal combustion engine.

2. Description of Related Art

The cylinder internal pressure sensor described in Japanese Patent Application Publication No. 2009-8694 has a cylindrical housing and a diaphragm that is provided at the leading end of the housing and deflects under the pressure inside a combustion chamber. An opposed member facing the diaphragm is provided inside the housing. The opposed member is one of members defining a housing room formed inside the housing. The housing room is a space surrounded by the inner surface of the diaphragm, the inner surface of the housing, and the opposed surface of the opposed member facing the diaphragm. A sensor element and a force transmission member are housed inside the housing room. The sensor element is fixed to the opposed member. The sensor element and the diaphragm are coupled together through the force transmission member. A cylinder internal pressure having acted on the diaphragm acts on the sensor element through the force transmission member. The sensor element outputs an electrical signal, corresponding to the cylinder internal pressure transmitted thereto, to a circuit part of the cylinder internal pressure sensor. The circuit part detects the cylinder internal pressure on the basis of the electrical signal output from the sensor element.

SUMMARY

Since the cylinder internal pressure sensor is installed with the leading end exposed to the combustion chamber, depending on its natural frequency, the cylinder internal pressure sensor may resonate with vibration excited by pressure fluctuation inside the combustion chamber. It is therefore necessary to set the natural frequency of the cylinder internal pressure sensor so as to prevent the resonance, for which it is desirable that the natural frequency be made easy to adjust. However, JP 2009-8694 A makes no disclosure as to this point and thus still has room for improvement.

The present disclosure discloses a cylinder internal pressure sensor of which the natural frequency is easy to adjust.

According to an aspect of the disclosure, a cylinder internal pressure sensor is provided. The cylinder internal pressure sensor includes: a housing; a diaphragm having flexibility and being joined to one end of the housing; a sensor element configured to change an output signal according to deformation of the diaphragm; and an opposed member housed inside the housing so as to face the diaphragm, and defining a housing room between the diaphragm and the opposed member. The opposed member includes: a cylindrical tube part being a layered structure with an inner tube and an outer tube; and a seal part provided inside the tube part. The sensor element is fixed to the seal part. The tube part is provided with a spring rate reducing portion which is provided between the diaphragm and a position where the inner tube and the outer tube are joined together.

In the above configuration, the spring rate reducing portion is provided in the tube part of the opposed member. The spring rate reducing portion is arranged in the opposed member on a vibration transmission path. Thus, it is easy to adjust the natural frequency of the cylinder internal pressure sensor. Here, the tube part of the opposed member can be considered a part with higher design flexibility than other parts constituting the cylinder internal pressure sensor.

According to the above mentioned aspect of the disclosure, the tube part may include a first region where the tube part has the seal part on the inside and a second region where the tube part does not have the seal part on the inside. The spring rate reducing portion may be provided in the second region.

According to the above configuration, the tube part includes the first region where the tube part has the seal part with the sensor element fixed thereto and the second region where the tube part is provided with the spring rate reducing portion, and thus the functions of the tube part are divided between the regions. It is therefore possible to secure the rigidity to stably hold the seal part and at the same time simplify the setting of the natural frequency of the cylinder internal pressure sensor.

According to the above mentioned aspect of the disclosure, the seal part may be fixed to the inner tube, and located between the spring rate reducing portion and the diaphragm. The outer tube may be joined to the diaphragm.

According to the above mentioned aspect of the disclosure, the spring rate reducing portion may be larger in length in a circumferential direction of the tube part than in an axial direction of the tube part. The circumferential direction of the tube part is orthogonal to the axial direction of the tube part.

Vibration transmitted to the opposed member acts in the direction of the axis of the tube part. Providing the spring rate reducing portion so as to extend longer in the direction orthogonal to the vibration transmission direction can effectively reduce the natural frequency of the cylinder internal pressure sensor. According to the above configuration, therefore, the natural frequency can be adjusted efficiently.

According to the above mentioned aspect of the disclosure, the spring rate reducing portion may be a through-hole. According to the above configuration, it is possible to change the natural frequency of the cylinder internal pressure sensor through the formation of a through-hole by drilling in the tube part of the opposed member. Thus, the natural frequency is easy to adjust.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
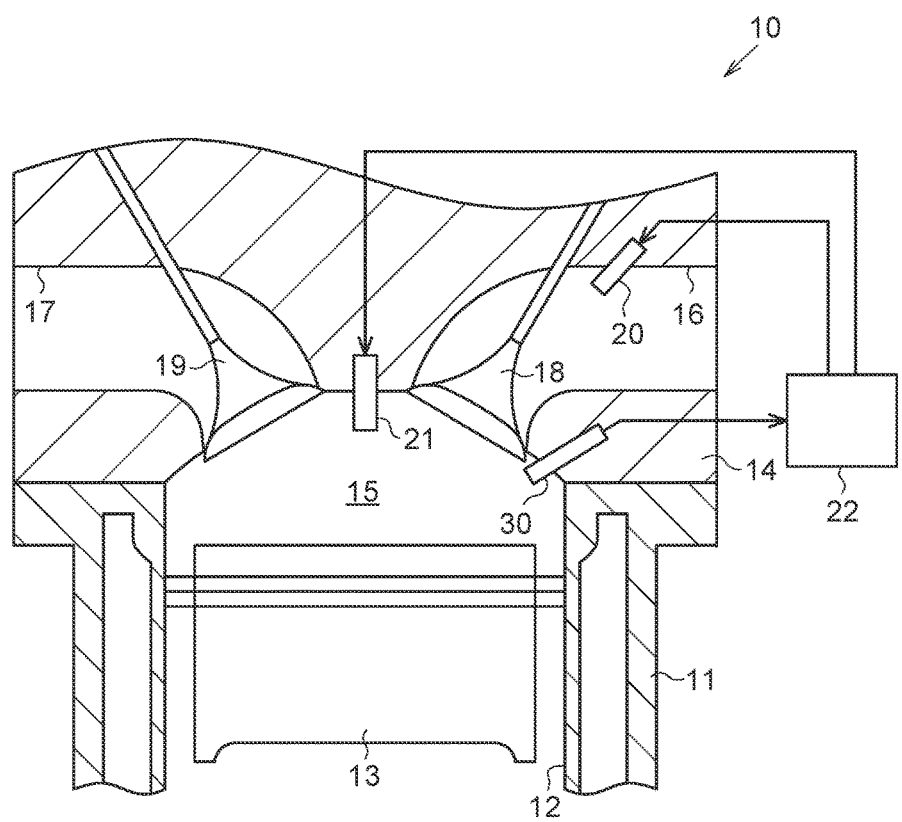
FIG. 1 is a sectional view schematically showing the configuration of an internal combustion engine including a cylinder internal pressure sensor.

An embodiment of a cylinder internal pressure sensor will be described with reference to FIG. 1 to FIG. 6. As shown in FIG. 1, an internal combustion engine 10 including the cylinder internal pressure sensor has a cylinder block 11. A cylinder 12 is formed inside the cylinder block 11. A piston 13 is provided inside the cylinder 12 so as to be reciprocable. A cylinder head 14 is fixed to an upper part of the cylinder block 11. A combustion chamber 15 is defined by the lower surface of the cylinder head 14, the inner surface of the cylinder 12, and the upper surface of the piston 13. The cylinder head 14 is provided with an intake port 16 and an exhaust port 17 each connected to the combustion chamber 15. The intake port 16 is provided with an intake valve 18 that provides and shuts off communication between the intake port 16 and the combustion chamber 15, and the exhaust port 17 is provided with an exhaust valve 19 that provides and shuts off communication between the exhaust port 17 and the combustion chamber 15. The intake port 16 is provided with a fuel injection valve 20 that injects fuel into the intake port 16. The fuel injected into the intake port 16 is mixed with intake air and introduced into the combustion chamber 15. The cylinder head 14 is provided with a spark plug 21 that initiates the combustion of the mixture of the fuel and the intake air introduced into the combustion chamber 15. The mixture combusted inside the combustion chamber 15 is discharged as exhaust gas through the exhaust port 17.

The cylinder head 14 is provided with a cylinder internal pressure sensor 30. The cylinder internal pressure sensor 30 is provided with one end thereof exposed to the inside of the combustion chamber 15, and detects a cylinder internal pressure that is the pressure inside the combustion chamber 15. Signals output from various sensors, including the cylinder internal pressure sensor 30, are input into a control device 22 of the internal combustion engine 10. On the basis of these signals, the control device 22 controls the fuel injection amount of the fuel injection valve 20 and the ignition timing of the spark plug 21.

Figure 2:
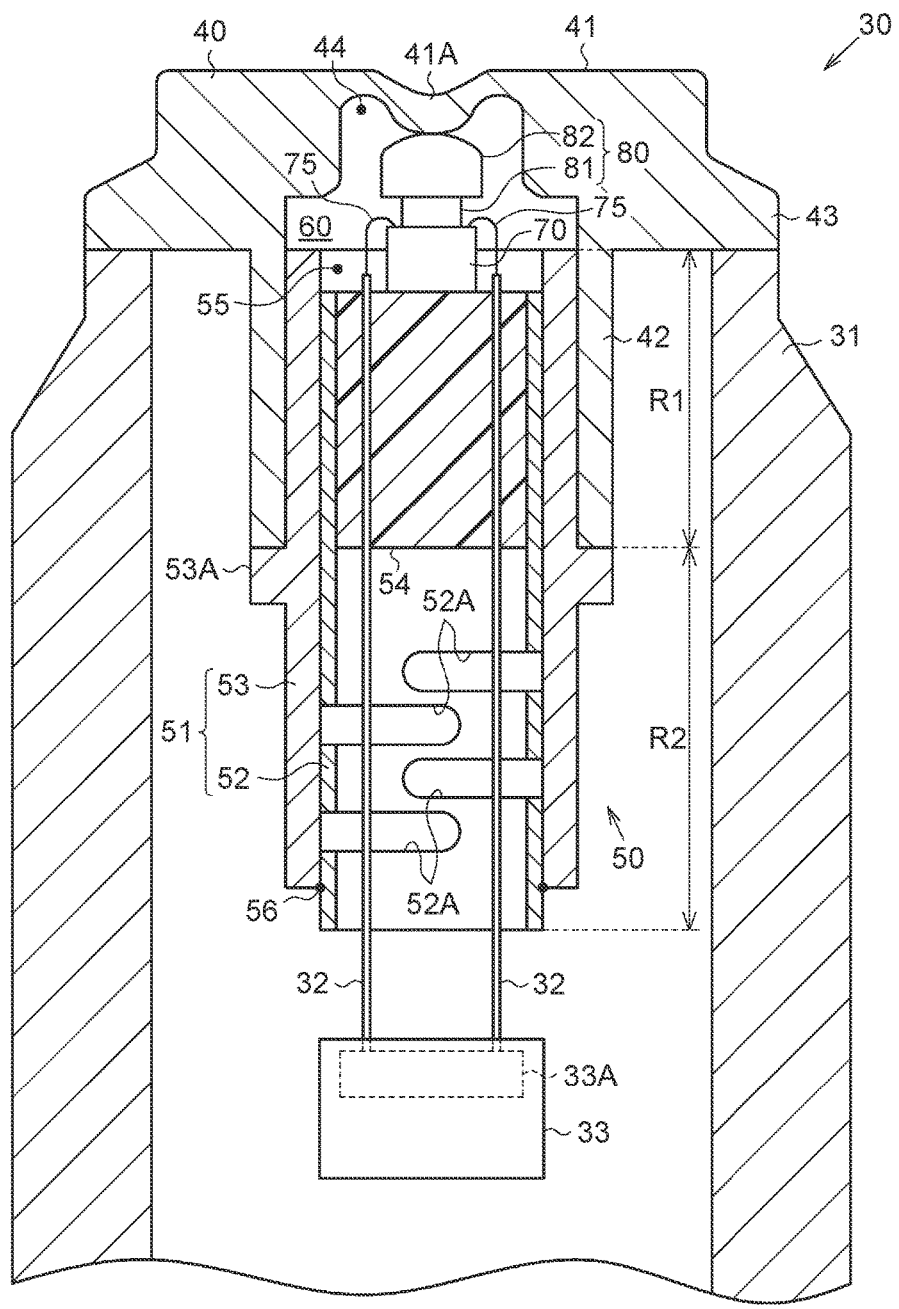
FIG. 2 is an enlarged sectional view showing a leading end of the cylinder internal pressure sensor.
Figure 3:
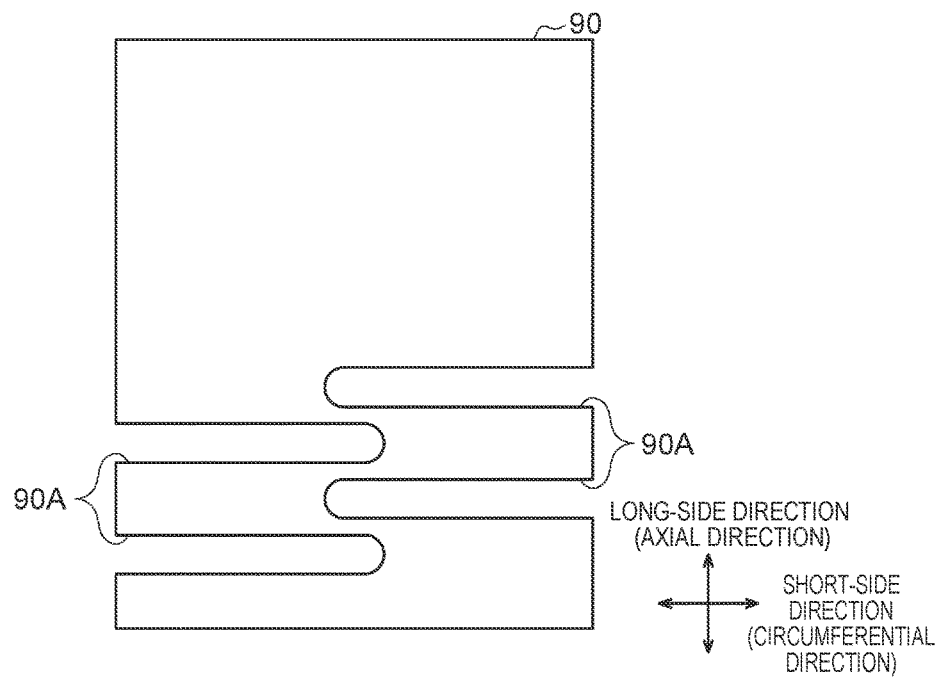
FIG. 3 is a development of an inner tube in a tube part of an opposed member.

As shown in FIG. 2, the cylinder internal pressure sensor 30 has a cylindrical housing 31. A flexible diaphragm 40 is provided at one end of the housing 31. The diaphragm 40 is made of metal, for example, and covers the one end of the housing 31. The diaphragm 40 has a main body part 41, and an extension part 42 that is cylindrically extended from the main body part 41 into the housing 31. The extension part 42 is separated from the inner surface of the housing 31. On the outer circumferential surface of the main body part 41, a flange 43 is provided of which the diameter increases outward and the outer circumferential surface is substantially flush with the outer circumferential surface of the housing 31. The flange 43 is joined by welding etc. to the one end of the housing 31. Thus, the diaphragm 40 is fixed to the housing 31. A center portion of the main body part 41 surrounded by the extension part 42 has a recessed shape formed by depressing the inner surface of the main body part 41 on the side of the housing 31, and this recessed portion constitutes a first housing space 44. As the first housing space 44 is provided, the main body part 41 has a smaller plate thickness in the center portion than in a peripheral portion, and this center portion constitutes a flexible portion 41A that deflects under the cylinder internal pressure. The flexible portion 41A is curved toward the housing 31 (downward in FIG. 2).

An opposed member 50 is inserted into the extension part 42. The opposed member 50 includes a cylindrical tube part 51 having a double-layer structure with an inner tube 52 and an outer tube 53, and a seal part 54 provided inside the tube part 51. The seal part 54 is fixed inside the inner tube 52. The outer diameter of the outer tube 53 of the tube part 51 is substantially equal to the inner diameter of the extension part 42. The outer tube 53 has an engaging portion 53A protruding outward from the outer circumferential surface thereof, and the engaging portion 53A is in contact with the leading end of the extension part 42. The engaging portion 53A and the leading end of the extension part 42 are joined together by welding, for example, and thus the opposed member 50 is fixed to the extension part 42. The axial length of the extension part 42 and the axial length of the portion of the outer tube 53 inserted into the extension part 42, i.e., the length of the outer tube 53 from the engaging portion 53A to the one end inserted into the extension part 42 are substantially equal. The outer diameter of the inner tube 52 is substantially equal to the inner diameter of the outer tube 53, and the inner tube 52 is substantially equal in axial length to the outer tube 53. Relative to the outer tube 53, the inner tube 52 is arranged at a position slightly misaligned to the side farther away from the diaphragm 40 in the direction of the axis of these tubes. The end (lower end in FIG. 2) of the tube part 51 on the side farther away from the diaphragm 40 is a hollow free end with no other member provided inside.

The seal part 54 has a columnar shape and is provided inside the inner tube 52, at one end (upper end in FIG. 2) on the side of the diaphragm 40. The seal part 54 seals the inside of the inner tube 52. The seal part 54 has an insulating property and is made of glass, for example. The tube part 51 is made of metal, for example. The end face of the seal part 54 on the side of the diaphragm 40 defines a second housing space 55 along with the inner surface of the outer tube 53 and the end face of the inner tube 52, and the one end face (upper end face in FIG. 2) of the opposed member 50 on the side of the diaphragm 40 faces the inner surface of the diaphragm 40. The first housing space 44 and the second housing space 55 communicate with each other, and a housing room 60 is formed by the first housing space 44 and the second housing space 55 between the diaphragm 40 and the opposed member 50.

The tube part 51 includes a first region R1 where the tube part 51 has the seal part 54 inside and a second region R2 where the tube part 51 does not have the seal part 54 inside. A plurality of through-holes 52A is formed in a part of the inner tube 52 that constitutes the second region R2. The plurality of through-holes 52A is one example of the spring rate reducing portion. The inner tube 52 is formed from a quadrangular flat sheet member 90 shown in FIG. 3. Portions of the sheet member 90 are removed by press working, for example, to form cutout holes 90A in the shape of being cut out from the end face of the sheet member 90 in the short-side direction (left-right direction in FIG. 3). Of the cutout holes 90A, those cutout holes 90A cut out from one end (right end) of the sheet member 90 in the short-side direction and those cutout holes 90 cut out from the other end (left end) are alternately provided in the long-side direction of the sheet member 90 (upper-lower direction in FIG. 3). The length of the cutout hole 90A in the short-side direction is larger than the length of the cutout hole 90A in the long-side direction. When seen from the long-side direction, the leading ends of the cutout holes 90A overlap one another. The cutout holes 90A are provided on the one end side (lower end side) relative to the center of the sheet member 90 in the long-side direction. The sheet member 90 is rolled into a cylindrical shape with both ends in the short-side direction joined together. Thus, the inner tube 52 is formed, and the ends from which the cutout holes 90A are cut out are closed to form the through-holes 52A. When the sheet member 90 is thus rolled into a cylindrical shape, the long-side direction coincides with the direction of the axis of the tube part 51, while the short-side direction coincides with the circumferential direction orthogonal to the direction of the axis of the tube part 51. Accordingly, the through-hole 52A, which is the cutout hole 90A formed as described above, is larger in length in the direction of the circumference of the tube part 51 than in the direction of the axis of the tube part 51, and the through-hole 52A serves as a lightening portion. The outer tube 53 is similarly formed by rolling a sheet member into a cylindrical shape.

As shown in FIG. 2, the lower end of the inner tube 52 is joined by welding, for example, to the outer circumferential surface of the outer tube 53. A joint 56 between the inner tube 52 and the outer tube 53 is formed along the entire circumference. The through-holes 52A as a whole are provided on the side of the diaphragm 40 relative to the joint 56 between the outer tube 53 and the inner tube 52 in the axial direction (upper-lower direction in FIG. 2), and the inner tube 52 and the outer tube 53 are joined together at a position farther away from the diaphragm 40 than the through-holes 52A. The shapes and the positions of the through-holes 52A, i.e., the cutout holes 90A, are set in advance through experiment, simulation, etc. such that a natural frequency A of the cylinder internal pressure sensor 30 matches a desired value. To set the natural frequency A of the cylinder internal pressure sensor 30, for example, first, the frequency of pressure fluctuation when knocking is occurring inside the combustion chamber 15 and the frequency of pressure fluctuation when pre-ignition is occurring inside the combustion chamber 15 are obtained in advance by experiment, simulation, etc. Then, a target value for the natural frequency A of the cylinder internal pressure sensor 30 is set on the basis of the frequencies obtained. Thereafter, the shapes and the positions of the through-holes 52A are determined through experiment, simulation, etc. such that the natural frequency A matches the target value. In this embodiment, the natural frequency A of the cylinder internal pressure sensor 30 is set to be an intermediate value between the frequency of pressure fluctuation when knocking is occurring inside the combustion chamber 15 (e.g., 52 kHz) and the frequency of pressure fluctuation when pre-ignition is occurring inside the combustion chamber 15 (e.g., 300 kHz) (52 kHz<A<300 kHz). More preferably, the natural frequency A is set to be an intermediate value between 100 kHz and 250 kHz (100 kHz<A<250 kHz). Even more preferably, the natural frequency A is set to be an intermediate value between 150 kHz and 200 kHz (150 kHz<A<200 kHz).

As shown in FIG. 2, a sensor element 70 and a force transmission member 80 are housed inside the housing room 60. The sensor element 70 is fixed at one end face to the seal part 54 of the opposed member 50. A glass block 81 is fixed to the other end face of the sensor element 70. A rod 82 is arranged between the glass block 81 and the diaphragm 40. The force transmission member 80 is composed of the glass block 81 and the rod 82. The rod 82 has a heat insulating property and is made of ceramics, for example. The rod 82 is in contact with the flexible portion 41A of the diaphragm 40, and the contact surface of the rod 82 is curved.

Figure 4:
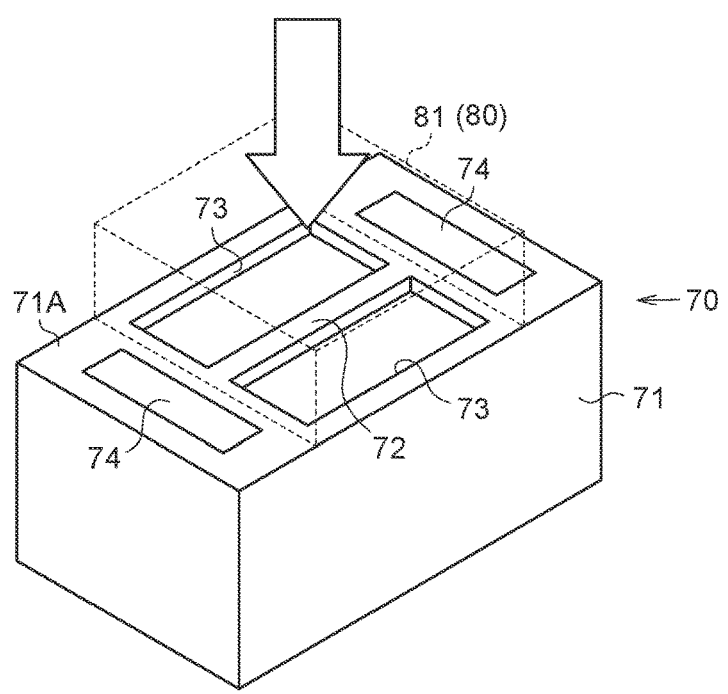
FIG. 4 is a perspective view showing the configuration of a sensor element.

As shown in FIG. 4, the sensor element 70 is made of silicone, for example, and has a substantially rectangular parallelepiped base portion 71. A mesa portion 72 that is a mesa-shaped protrusion and changes in resistance value according to the load acting thereon is formed in the other end face 71A of the base portion 71 to which the glass block 81 is fixed. The mesa portion 72 is formed by forming two grooves 73 in the other end face 71A. The glass block 81 is arranged so as to cover the mesa portion 72 and the grooves 73, and is fixed by anodic bonding, for example, to the base portion 71. The base portion 71 is provided with a pair of electrodes 74 respectively on both sides across the mesa portion 72. One end of the mesa portion 72 is electrically connected to one of the electrodes 74, and the other end of the mesa portion 72 is electrically connected to the other electrode 74.

As shown in FIG. 2, a lead wire 75 is connected to each of the electrodes 74. The lead wires 75 are respectively connected to long thin terminals 32 that extend through the seal part 54. The terminals 32 are connected to a circuit part 33 of the cylinder internal pressure sensor 30. The circuit part 33 is provided with a constant-current circuit 33A that has a constant-current source and is controlled such that a constant current flows therethrough. The pair of electrodes 74 of the sensor element 70 is connected to the constant-current circuit 33A of the circuit part 33 through the lead wires 75, and a constant current is supplied to the sensor element 70. In the state of the cylinder internal pressure sensor 30 being installed in the internal combustion engine 10, the cylinder internal pressure acts on the diaphragm 40. When the flexible portion 41A of the diaphragm 40 deflects toward the housing 31 (downward in FIG. 2) according to the cylinder internal pressure, the glass block 81 is pressed toward the sensor element 70 through the rod 82 as indicated by the arrow in FIG. 4. When the load acts on the sensor element 70, the resistance value of the mesa portion 72 changes, resulting in a change in voltage generated across the pair of electrodes 74. A signal corresponding to this voltage is output to the circuit part 33, and the cylinder internal pressure is detected by the circuit part 33.

Figure 5:
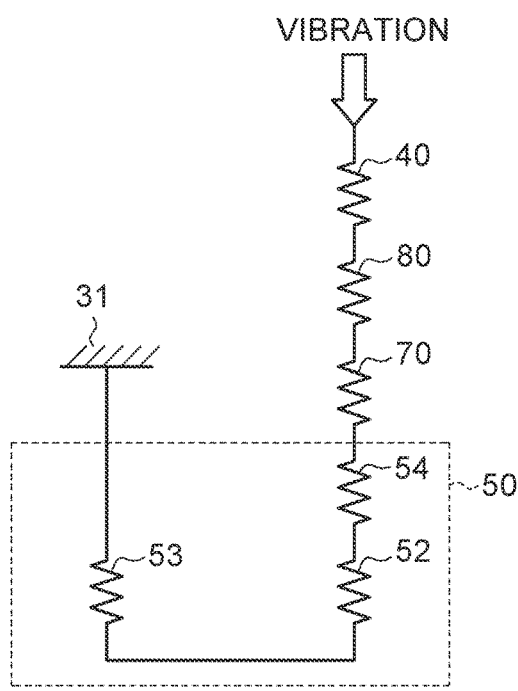
FIG. 5 is a schematic view showing the form of transmission of vibration among components of the cylinder internal pressure sensor.
Figure 6:
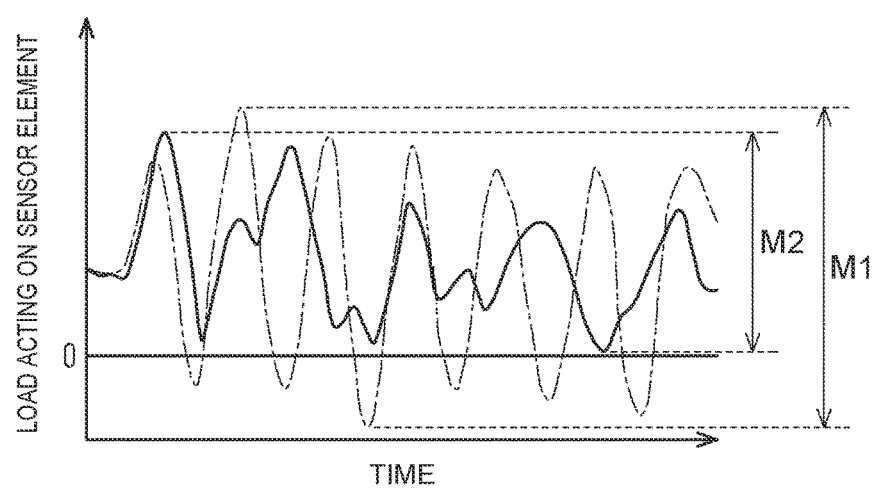
FIG. 6 is a graph showing changes in load acting on the sensor element.

Next, the workings of this embodiment will be described with reference to FIG. 5 and FIG. 6. The pressure inside the combustion chamber 15 fluctuates according to the operation state of the internal combustion engine 10. Thus, the frequency of pressure fluctuation inside the combustion chamber 15 also changes variously. If the frequency of pressure fluctuation inside the combustion chamber 15 of the internal combustion engine 10 approaches the natural frequency A of the cylinder internal pressure sensor 30, the cylinder internal pressure sensor 30 resonates. If the cylinder internal pressure sensor 30 resonates, the components thereof, including the diaphragm 40, vibrate, which may lead to unstable behavior of the cylinder internal pressure sensor 30. It is therefore important to set the natural frequency A in view of suppressing the resonance of the cylinder internal pressure sensor 30. In the cylinder internal pressure sensor 30, for example, making the rod 82 longer or thinner can cause a reduction in durability, and there are also various restrictions on the shape of the sensor element 70. In this embodiment, the through-holes 52A are formed in the tube part 51 of the opposed member 50 that is a part with fewer restrictions on the design, hence higher design flexibility, than the other parts constituting the cylinder internal pressure sensor 30. The tube part 51 has a layered structure with the inner tube 52 and the outer tube 53, and the through-holes 52A are provided in the inner tube 52 on the side of the diaphragm 40 relative to the joint 56 at which the inner tube 52 and the outer tube 53 are joined together. As shown in FIG. 5, in this embodiment, vibration caused by the cylinder internal pressure acting on the diaphragm 40 is transmitted to the force transmission member 80 and the sensor element 70, and is then transmitted through the opposed member 50 to the housing 31. In the opposed member 50, the vibration is transmitted to the outer tube 53 through the seal part 54, the inner tube 52, and the joint 56. The through-holes 52A are provided on the vibration transmission path, and the spring rate of the opposed member 50 is reduced as the through-holes 52A are provided in the opposed member 50. Accordingly, the natural frequency A of the cylinder internal pressure sensor 30 is reduced. In this embodiment, the natural frequency A of the cylinder internal pressure sensor 30 is set by means of the through-holes 52A so as to be an intermediate value between the frequency of pressure fluctuation when knocking is occurring inside the combustion chamber 15 and the frequency of pressure fluctuation when pre-ignition is occurring inside the combustion chamber 15. Vibration of varying frequencies occurs inside the combustion chamber 15 while the internal combustion engine 10 is in operation. During normal operation when pre-ignition is not occurring, the frequency of pressure fluctuation inside the combustion chamber 15 reaches its maximum when knocking is occurring, and the frequency is lower when knocking is not occurring. It is therefore possible to suppress the resonance of the cylinder internal pressure sensor 30 during normal operation of the internal combustion engine 10 by setting the natural frequency A to be higher than the frequency when knocking is occurring (e.g., 52 kHz) as in this embodiment. It goes without saying, however, that the frequency when knocking is occurring varies according to the structure and the operation state of the internal combustion engine 10 and is not limited to the above-mentioned frequency. The frequency of pressure fluctuation inside the combustion chamber 15 when pre-ignition is occurring is higher than the frequency of pressure fluctuation inside the combustion chamber 15 when knocking is occurring. Moreover, when pre-ignition occurs, the cylinder internal pressure rises and the amplitude of vibration excited by pressure fluctuation inside the combustion chamber 15 becomes larger. Therefore, if the cylinder internal pressure sensor 30 resonates with this vibration, the amplitude of vibration excited in the components of the cylinder internal pressure sensor 30 may become large. In this embodiment, resonance of the cylinder internal pressure sensor 30 can be suppressed even if pre-ignition occurs in the internal combustion engine 10, since the natural frequency A is set to be lower than the frequency when pre-ignition is occurring (e.g., 300 kHz). Specifically, an amplitude M2, indicated by the solid line in FIG. 6, of a load acting on the sensor element 70 when pre-ignition is occurring is smaller than an amplitude M1, indicated by the one-dot dashed line in FIG. 6, of a load when resonance is caused by pre-ignition, and thus unstable behavior of the cylinder internal pressure sensor 30 can be favorably prevented. It goes without saying, however, that the frequency when pre-ignition is occurring varies according to the structure and the operation state of the internal combustion engine 10 and is not limited to the above-mentioned frequency.

In this embodiment, the through-holes 52A are provided in the second region R2 of the tube part 51. Accordingly, the tube part 51 includes the first region R1 where the tube part 51 has the seal part 54 with the sensor element 70 fixed thereto and the second region R2 where the tube part 51 is provided with the through-holes 52A, and thus the functions of the tube part 51 are divided between the regions R1, R2.

Vibration transmitted to the opposed member 50 acts in the direction of the axis of the tube part 51. In this regard, the through-holes 52A are larger in length in the direction of the circumference of the tube part 51 than in the direction of the axis thereof, so that it is easy to reduce the spring rate of the tube part 51 and the natural frequency A of the cylinder internal pressure sensor 30 is reduced effectively.

It is possible to form the tube part 51, which includes the through-holes 52A as the spring rate reducing portions in the inner tube 52 of the opposed member 50, by drilling the sheet member 90, and thus to change the natural frequency A of the cylinder internal pressure sensor 30.

According to the embodiment having been described above, the following effects can be achieved. The through-holes 52A are provided in the tube part 51 of the opposed member 50 and the inner tube 52 and the outer tube 53 of the tube part 51 are joined together at a position farther away from the diaphragm 40 than the through-holes 52A, which makes it easy to adjust the natural frequency A of the cylinder internal pressure sensor 30.

The through-holes 52A are provided in the second region R2 of the tube part 51. Thus, it is possible to secure the rigidity to stably hold the seal part 54 and at the same time simplify the setting of the natural frequency A of the cylinder internal pressure sensor 30.

Since the through-holes 52A are larger in length in the circumferential direction than in the axial direction, the natural frequency A can be adjusted efficiently. The through-holes 52A are provided as the spring rate reducing portions in the tube part 51, which makes it easy to adjust the natural frequency A.

The above embodiment can be implemented with the following changes made thereto. Where possible, the following modified examples can also be implemented in combination as appropriate. For example, the force transmission member 80 can be omitted in the case of the following configuration. That is, a protrusion protruding from the inner surface of the flexible portion 41A toward the opposed member 50 is provided on the diaphragm 40. The protrusion is fixed to the other end face 71A of the sensor element 70. In this configuration, the diaphragm 40 and the sensor element 70 are directly coupled together, so that the load directly acts on the sensor element 70 according to the deformation of the diaphragm 40.

The extension part 42 of the diaphragm 40 can be omitted. In this case, the outer diameter of the opposed member 50 is set to be substantially equal to the inner diameter of the housing 31, and a part of the inside of the housing 31 in the axial direction is closed with the opposed member 50. In this configuration, the housing room 60 is defined by the inner surface of the diaphragm 40, the inner surface of the housing 31, and the end face of the opposed member 50 facing the diaphragm 40.

Figure 7:
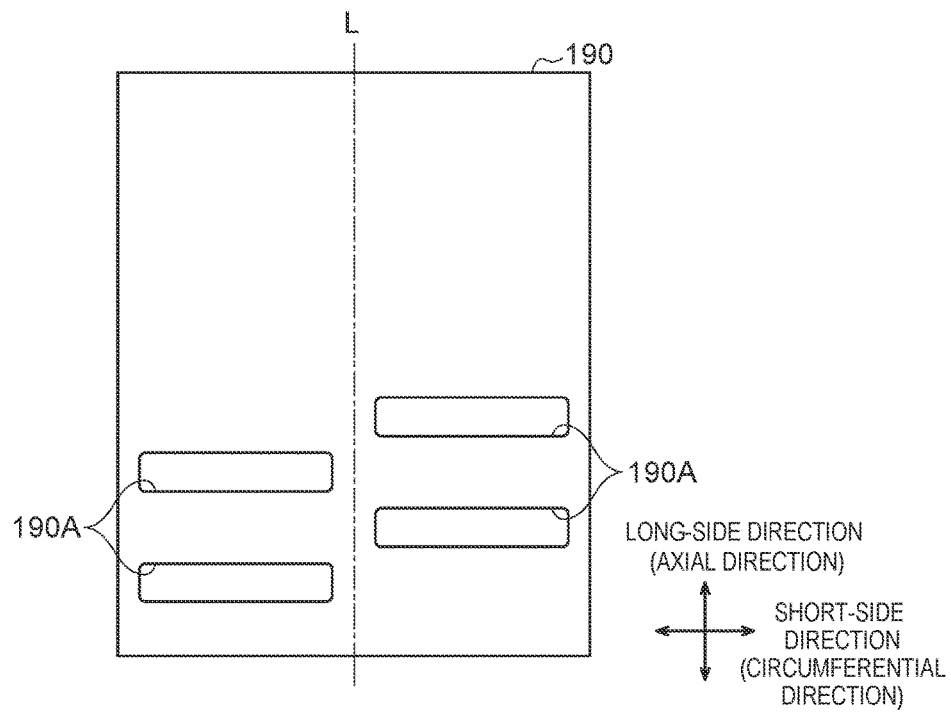
FIG. 7 is a development showing another example of the inner tube in the tube part of the opposed member.

The configuration of the inner tube 52 is not limited to that described above but may be changed as follows, for example. As shown in FIG. 7, portions of a sheet member 190 constituting the inner tube 52 are removed by press working, for example, to form spring rate reducing holes 190A. The spring rate reducing hole 190A is a long hole that is longer in the direction of the short side of the sheet member 190 (left-right direction in FIG. 7) than in the direction of the long side of the sheet member 190 (upper-lower direction in FIG. 7) orthogonal to the short-side direction. In the sheet member 190, two spring rate reducing holes 190A are provided side by side in the long-side direction in a region on one end side (right end side) in the short-side direction relative to a centerline L as the border, and two spring rate reducing holes 190A are provided side by side in the long-side direction in a region on the other end side (left end side) in the short-side direction relative to the centerline L as the border. It goes without saying, however, that the number of the spring rate reducing holes 190A provided side by side in the long-side direction can be changed as appropriate. The spring rate reducing holes 190A provided in the region on the one end side (right end side) and the spring rate reducing holes 190A provided in the region on the other end side (left end side) are arranged at positions misaligned in the long-side direction. Rolling the sheet member 190 into a cylindrical shape such that both ends in the short-side direction come into contact with each other can form the inner tube 52 provided with the spring rate reducing portions. Thus, the long-side direction coincides with the direction of the axis of the tube part 51, while the short-side direction coincides with the direction of the circumference of the tube part 51.

Figure 8:
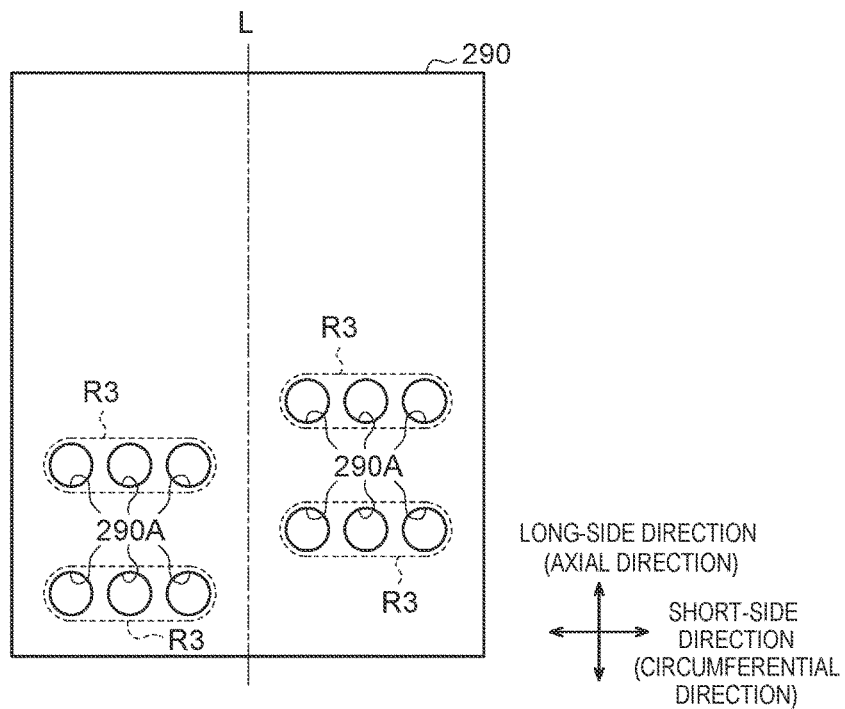
FIG. 8 is a development showing another example of the inner tube in the tube part of the opposed member.

As shown in FIG. 8, portions of a sheet member 290 constituting the inner tube 52 are removed by press working, for example, to form spring rate reducing holes 290A. The spring rate reducing hole 290A has the shape of a substantially exact circle, and a plurality of spring rate reducing holes 290A are arranged in proximity to one another in the direction of the short side of the sheet member 290 (left-right direction in FIG. 8) orthogonal to the direction of the long side of the sheet member 290 (upper-lower direction in FIG. 8). The plurality of spring rate reducing holes 290A arranged in proximity to one another form a spring rate reducing hole group R3 in the sheet member 290. Each spring rate reducing hole group R3 can be regarded as one spring rate reducing portion, and the length of the spring rate reducing hole group R3 in the short-side direction is larger than the length of the spring rate reducing hole group R3 in the long-side direction. The length of the spring rate reducing hole group R3 in the short-side direction can be regarded as the sum of the lengths of the spring rate reducing holes 290A in the short-side direction, and the length of the spring rate reducing hole group R3 in the long-side direction can be regarded to be equal to the length of each spring rate reducing hole 290A in the long-side direction. The form of arrangement of the spring rate reducing hole groups R3 is substantially the same as the form of arrangement of the spring rate reducing holes 190A shown in FIG. 7. The number of the plurality of spring rate reducing holes 290A that are disposed in proximity to one another to form a group can be changed as appropriate. Rolling the sheet member 290 into a cylindrical shape such that both ends in the short-side direction come into contact with each other can form the inner tube 52 provided with the spring rate reducing portions. Thus, the long-side direction coincides with the direction of the axis of the tube part 51, while the short-side direction coincides with the direction of the circumference of the tube part 51. For both the spring rate reducing holes 190A shown in FIG. 7 and the spring rate reducing holes 290A shown in FIG. 8, those spring rate reducing holes 190A, 290A provided in the region on the one end side (right end side) relative to the centerline L as the border and those spring rate reducing holes 190A, 290A provided in the region on the other end side (left end side) may be provided at positions overlapping each other or at the same positions in the long-side direction.

Figure 9:
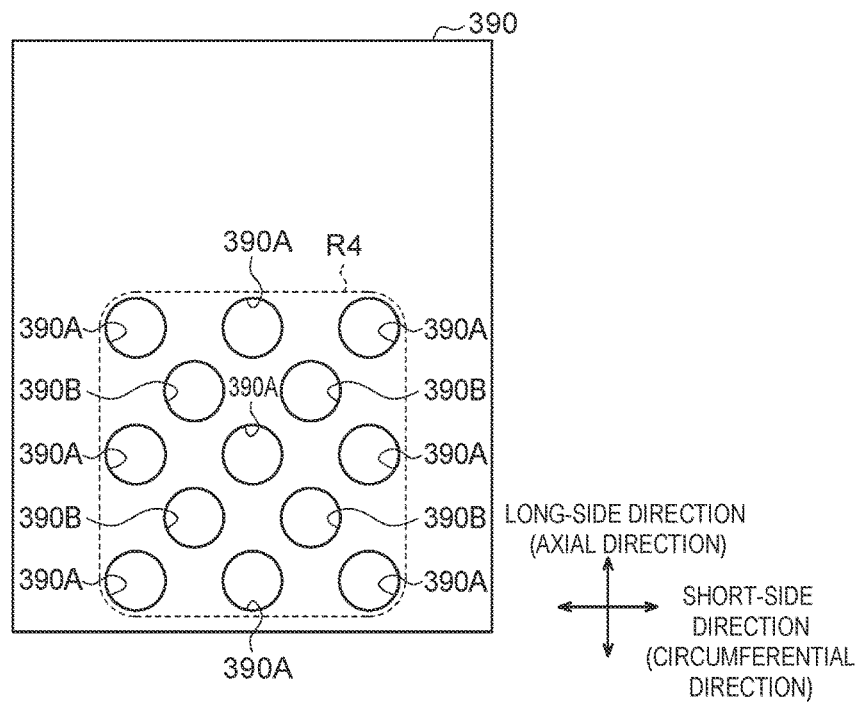
FIG. 9 is a development showing another example of the inner tube in the tube part of the opposed member.

As shown in FIG. 9, a spring rate reducing hole group R4 may be formed in a sheet member 390 constituting the inner tube 52. The spring rate reducing hole group R4 is composed of spring rate reducing holes 390A that are disposed in threes side by side in the direction of the short side of the sheet member 390 (left-right direction in FIG. 9) and spring rate reducing holes 390B that are disposed in twos side by side in the short-side direction. Each of the spring rate reducing holes 390A, 390B has the shape of a substantially exact circle. The spring rate reducing holes 390A are disposed at equal intervals in the direction of the long side of the sheet member 390 (upper-lower direction in FIG. 9) and in the short-side direction. The spring rate reducing holes 390B are disposed between the spring rate reducing holes 390A, and are disposed at equal intervals in the long-side direction and the short-side direction. The distance from the center of each spring rate reducing hole 390B to the center of each one of the plurality of spring rate reducing holes 390A adjacent to that spring rate reducing hole 390B is equal. The spring rate reducing hole group R4 constitutes the spring rate reducing portion. The length of the spring rate reducing hole group R4 in the long-side direction, which is the sum of the lengths of the spring rate reducing holes 390A, 390B in the long-side direction, and the length of the spring rate reducing hole group R4 in the short-side direction, which is the sum of the lengths of the spring rate reducing holes 390A, 390B in the short-side direction, are equal. Rolling the sheet member 390 into a cylindrical shape with both ends in the short-side direction joined together can also form the inner tube 52 provided with the spring rate reducing portions. In the case of the sheet member 390 of such configuration, the form of arrangement of the spring rate reducing holes 390A, 390B allows the sheet member to be evenly rolled, and thus the formability of the inner tube 52 is enhanced.

Figure 10:
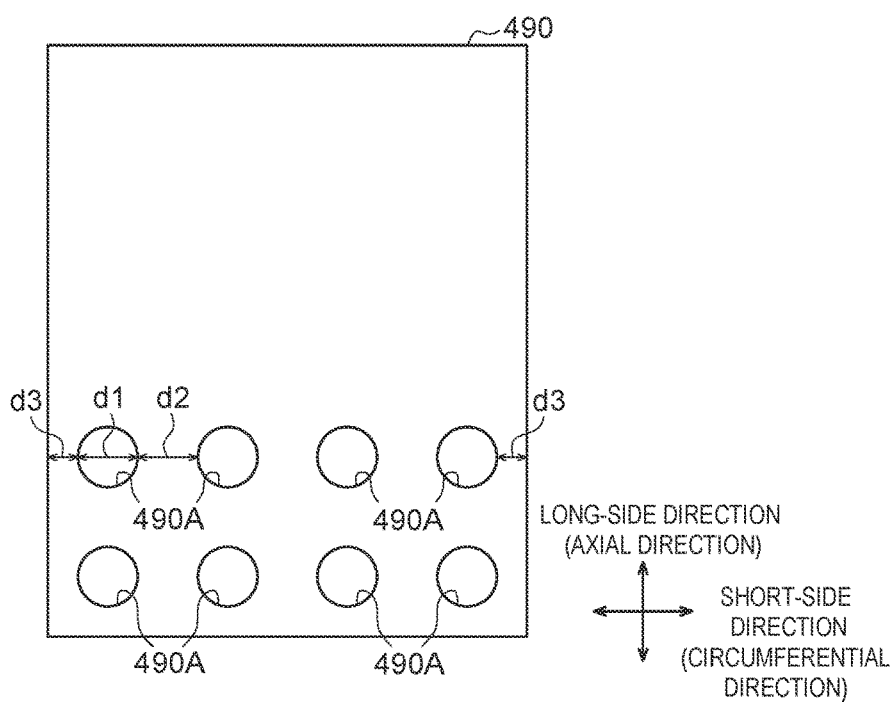
FIG. 10 is a development showing another example of the inner tube in the tube part of the opposed member.

As shown in FIG. 10, a plurality of spring rate reducing holes 490A may be formed in a sheet member 490. Each spring rate reducing hole 490A has the shape of a substantially exact circle with a diameter d1. The spring rate reducing holes 490A are disposed at intervals of a distance d2, which is substantially equal to the diameter d1 (d1=d2), in the direction of the short side of the sheet member 490 (left-right direction in FIG. 10). A distance d3 from each spring rate reducing hole 490A provided adjacent to the end of the sheet member 490 in the short-side direction to that end is set to be half the diameter d1. Rolling the sheet member 490 into a cylindrical shape with both ends in the short-side direction joined together can form the inner tube 52 provided with the spring rate reducing portions. Thus, the short-side direction coincides with the direction of the circumference of the tube part 51. When the tube part 51 is formed from the sheet member 490, the interval between the spring rate reducing holes 490A provided adjacent to the ends becomes equal to the distance d2 (=diameter d1) as both ends are joined together, so that the spring rate reducing holes 490A are disposed in the circumferential direction at intervals equal to the diameter of the spring rate reducing holes 490A. Thus, in the tube part 51, the spring rate reducing portions and non-spring rate reducing portions are present at an equal ratio in the circumferential direction. As with the sheet member 390, the sheet member 490 is easy to roll evenly, and the formability of the inner tube 52 is enhanced. The numbers and the shapes of both the spring rate reducing holes 390A, 390B shown in FIG. 9 and the spring rate reducing holes 490A shown in FIG. 10 can be changed. For example, the spring rate reducing holes 390A, 390B, 490B may have an oblong shape, a rhombus shape, or a polygonal shape.

In the above examples, the inner tube 52 is formed by rolling the sheet members 90, 190, 290, 390, 490 into a cylindrical shape, but the formation method of the inner tube 52 is not limited thereto. In the above examples, the outer tube 53 is also formed by rolling a sheet member into a cylindrical shape, but the formation method of the outer tube 53 is not limited thereto, either. For example, the cylindrical inner tube 52 and outer tube 53 may be formed by cutting a metal block. In such configuration, the through-holes 52A can be formed by appropriately drilling the inner tube 52 that has been formed into a cylindrical shape.

In the above examples, the through-holes 52A or the spring rate reducing holes 190A, 290A, 390A, 390B, 490A are provided as the spring rate reducing portions in the inner tube 52. However, the configuration of the spring rate reducing portions is not limited to that of such holes. For example, a thin-walled portion with a smaller plate thickness than the other portions may be provided as the spring rate reducing portion in the inner tube 52.

The spring rate reducing portion may be provided in the outer tube 53 instead of in the inner tube 52. Alternatively, the spring rate reducing portion may be provided in both the inner tube 52 and the outer tube 53. In the case where the spring rate reducing portion is provided in the outer tube 53, it is desirable that the spring rate reducing portion be provided in a region of the outer tube 53 from the engaging portion 53A to the joint 56.

The engaging portion 53A may be provided in the first region R1 of the tube part 51. The number of the through-holes 52A may be one. The spring rate reducing portion may be provided at a position straddling the joint 56 in the axial direction.

The spring rate reducing portion may be equally long in the axial direction and in the circumferential direction, or may be shorter in the circumferential direction than in the axial direction. The spring rate reducing portion may be provided in the first region R1, instead of in the second region R2, of the tube part 51. Alternatively, the spring rate reducing portion may be provided in both the first region R1 and the second region R2 of the tube part 51.

The second region R2 may be omitted so as to form the tube part 51 by the first region R1 alone. That is, the axial lengths of the inner tube 52, the outer tube 53, and the seal part 54 may be equal, and these parts may be fixed to one another such that the positions in the axial direction coincide with one another.

In the case where the seal part 54 and the tube part 51 are made of a metal material, these parts may be formed as an integral part. The tube part 51 may have a layered structure with three or more layers.

Another member may be provided inside the hollow end of the tube part 51 on the side farther away from the diaphragm 40. The other member may have one end inserted into the end of the tube part 51 and the other end coupled to the housing 31, and the end of the tube part 51 and the housing 31 may be coupled together through the other member. In this case, the end of the tube part 51 is not a free end but a fixed end.

The form of joining together the inner tube 52 and the outer tube 53 is not limited to joining together the one end of the inner tube 52 and the outer circumferential surface of the outer tube 53. For example, the inner circumferential surface of the inner tube 52 and the outer circumferential surface of the outer tube 53 may be joined together. In this case, too, the joint is arranged at a position farther away from the diaphragm 40 than the spring rate reducing portions.

The form of setting the natural frequency A of the cylinder internal pressure sensor 30 can be changed as appropriate. For example, the natural frequency A may be set to be lower than the frequency when knocking is occurring. In this configuration, resonance of the cylinder internal pressure sensor 30 can be suppressed at least when pre-ignition is occurring. Moreover, the natural frequency A may be set to be lower than the minimum value of the frequency in the normal operation range (e.g., the frequency during idle operation) of the internal combustion engine 10.

The dimensions and the shapes of the sheet members 90, 190, 290, 390, 490 can be changed as appropriate. For example, the sheet members 90, 190, 290, 390, 490 may have a rectangular plate shape such that the length in the circumferential direction becomes larger than the length in the axial direction when the sheet members are rolled into a cylindrical shape, or may have a square plate shape.

What is claimed is:

1. A cylinder internal pressure sensor comprising:
a cylindrical housing;
a diaphragm having flexibility, the diaphragm being provided at one end of the housing;
an opposed member facing an inner surface of the diaphragm, the opposed member defining a housing room between the diaphragm and the opposed member; and
a sensor that is housed in the housing room and that changes an output signal according to deformation of the diaphragm, wherein
the opposed member includes a cylindrical tube and a seal, the cylindrical tube being a layered structure with an inner tube and an outer tube, the seal being provided inside the inner tube, the sensor being fixed to the seal, the inner tube being provided with a plurality of through-holes formed in a circumferential direction, and the inner tube and the outer tube are joined together at a position farther away from the diaphragm than the plurality of through-holes,
the cylindrical tube includes a first region where the cylindrical tube has the seal on an inside of the inner tube and a second region where the cylindrical tube does not have the seal on an inside of the inner tube, and
the plurality of through-holes are provided in the second region.

2. The cylinder internal pressure sensor according to claim 1, wherein one or more of the plurality of through-holes is larger in length in the circumferential direction of the inner tube than in an axial direction of the inner tube, the circumferential direction of the inner tube being orthogonal to the axial direction of the inner tube.

* * * * *